United States Patent [19]

Iverson

[11] Patent Number: 4,685,685
[45] Date of Patent: Aug. 11, 1987

[54] MOLDED SEAL WITH INCLINED CROSS BRACES

[75] Inventor: Dennis H. Iverson, Salt Lake City, Utah

[73] Assignee: Cyl - Pak, Inc., Salt Lake City, Utah

[21] Appl. No.: 942,178

[22] Filed: Dec. 16, 1986

[51] Int. Cl.[4] ............................................. F16J 15/32
[52] U.S. Cl. ................................... 277/205; 277/215
[58] Field of Search ............... 277/205, 206 R, 207 R, 277/212 R, 212 C, 215, 152

[56] References Cited

U.S. PATENT DOCUMENTS

| 2,465,175 | 3/1949 | Schwarz et al. | 277/205 |
| 2,665,151 | 1/1954 | Fisler et al. | 277/215 X |
| 3,851,888 | 12/1974 | Limpson et al. | 277/206 R |
| 4,193,606 | 3/1980 | Iverson | 277/205 |
| 4,577,874 | 3/1986 | Zitting | 277/165 |

FOREIGN PATENT DOCUMENTS

| 660715 | 4/1963 | Canada | 277/205 |
| 56-39359 | 4/1981 | Japan | 277/215 |
| 1214986 | 12/1970 | United Kingdom | 277/205 |

Primary Examiner—Robert S. Ward
Attorney, Agent, or Firm—John R. Merkling

[57] ABSTRACT

An annular sealing ring with a generally Y-shaped cross-section for sealing between a piston and the curved wall of a cylinder. The sealing ring includes a base and a pair of lips with sealing edges, the lips being spaced apart to form a cavity therebetween. Braces connect the lips a regular intervals, forming trapezoidal voids.

4 Claims, 4 Drawing Figures

U.S. Patent    Aug. 11, 1987    4,685,685
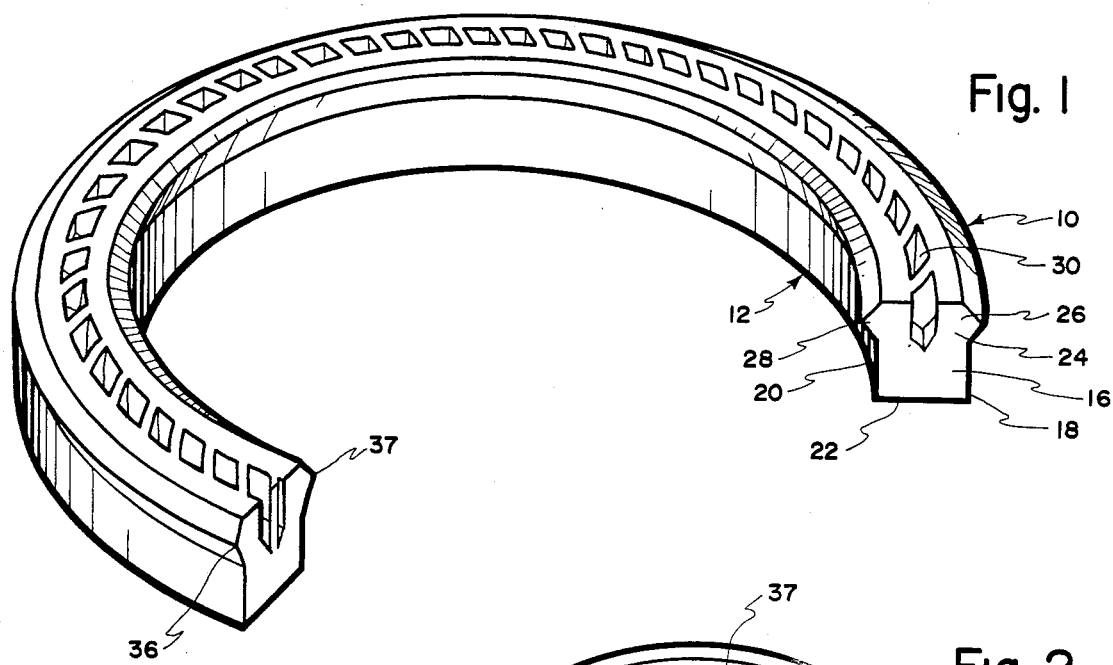
Fig. 1
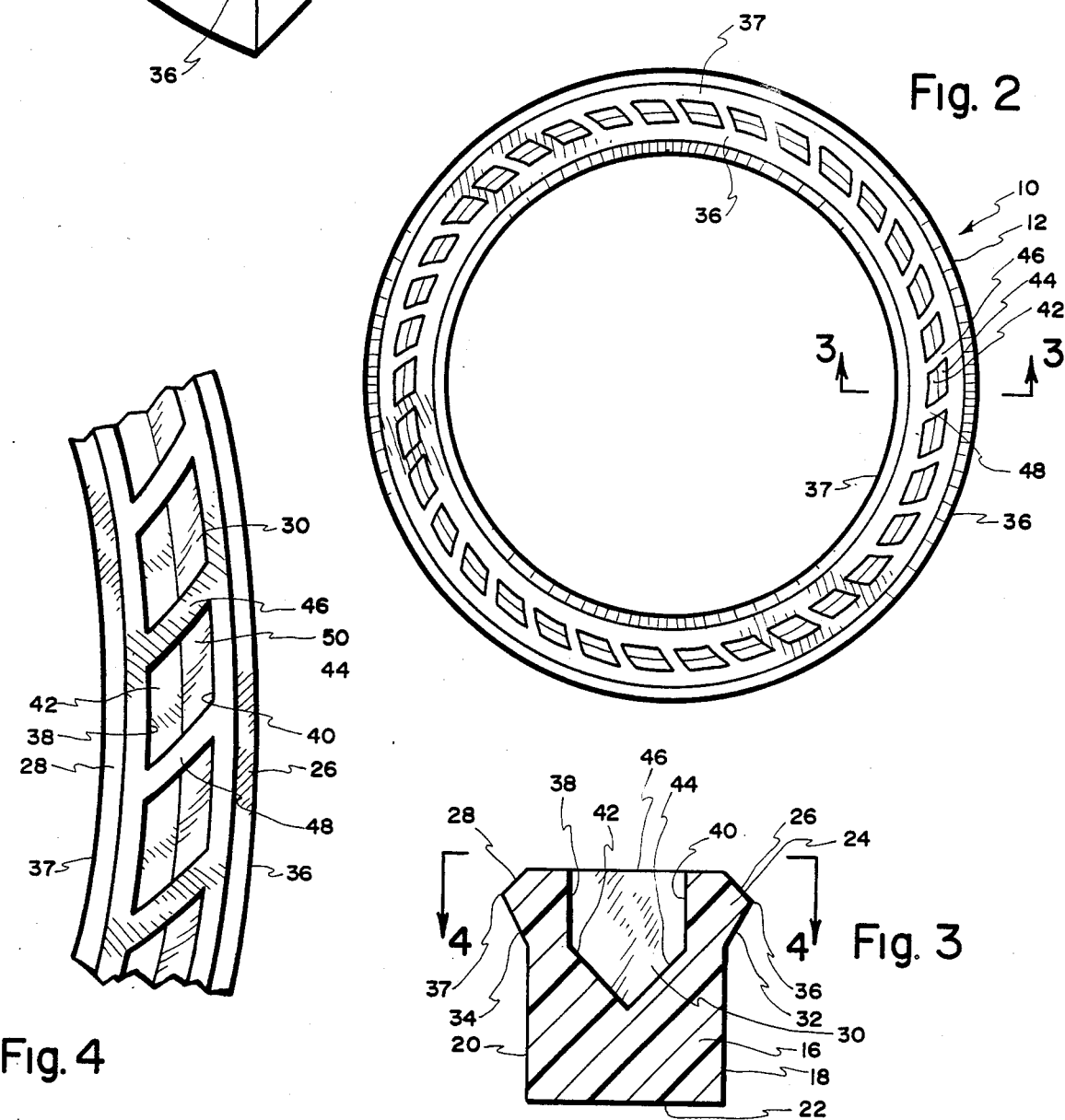
Fig. 2
Fig. 4
Fig. 3

MOLDED SEAL WITH INCLINED CROSS BRACES

FIELD OF INVENTION

This invention relates generally to hydraulic seals and more particularly to a novel molded seal having generally trapezoidal voids defined by inclined cross braces for increased flexibility and wear characteristics.

PRIOR ART

In the past, it has been common to provide seals for hydraulic and pneumatic use, wherein the seal assembly comprises a generally Y-shaped cross-section having a pair of sealing lips with sealing edges extending sideways therefrom. Cross braces join the lips to provide resistance to compression. In prior art seals, however, the braces have been perpendicular to the lips. When pressure was applied to the lips, the braces distorted or crushed after very little displacement of the lips. Such seals could not accomodate either substantial wear or substantial variation in the gap between adjacent machine parts without failure of the seal. Moreover, a significant displacement of the lips under pressure could result in permanent deformation of the seal.

The outwardly extending sealing lips are maintained in a correct orientation to provide a hydraulic or pneumatic seal by a stem which slidingly engages neighboring machine part walls. In other prior art seals, an expander ring, retained between the lips, forces the sealing lips against adjacent walls to prevent fluid from passing the seal. Prior art expanders have been formed of elastomeric materials. The degree to which the seal assembly could expand to compensate for wear and irregularities between the machine parts has been limited by the properties of the material from which the expander ring was formed. Moreover, the lateral force exerted by the expander ring at various stages of lateral compression has varied greatly with the amount of lateral compression. The expander rings also had a very limited range of compression and expansion. Consequently, seal assemblies would begin to fail after relatively little wear.

BRIEF SUMMARY AND OBJECT OF THE INVENTION

The present invention provides for a sealing ring with a generally Y-shaped cross-section having a stem and a pair of lips with sealing edges. The lips are spaced apart to form a channel. A plurality of braces connect the lips and form a series of trapezoidal voids between the lips. External pressure compresses the seal by distorting the trapezoidal voids, causing them to become more accute. The seal can accomodate relatively substantial variations in separation between two machine parts while exerting relatively uniform pressure against adjacent machine part walls.

With the foregoing in mind, it is an object of the present invention to provide a novel hydraulic or pneumatic seal comprising two opposed lips connected by braces at a non-perpendicular angle.

A further important object of the present invention is to provide an annular seal comprising a Y-shaped, double-apex, restricted contact sealing element and spring elements located within the Y of the sealing element, the spring elements accomodating a relatively large range of uniform expansion and compression.

It is an additional dominant object of the present invention to provide for a novel expander ring having pre-determined distortion characteristics to permit substantial variation in size in one dimension.

It is a further principle object of the present invention to provide for a novel seal having braces with elastomeric properties generally surrounding trapezoidal caveties.

These and other objects of the present invention will be apparent from the detailed description, taken with reference to the accompanying drawings.

BRIEF DESCRIPTION OF THE DRAWINGS

FIG. 1 is a broken isometric drawing of the composite seal made in accordance with the principles of this invention;

FIG. 2 is a top view of a seal made in accordance with the present invention;

FIG. 3 is an enlarged cross-sectional view of the seal taken along line 3—3 of FIG. 2;

FIG. 4 is an expanded top view of a portion of the seal taken along line 4—4 of FIG. 3.

DETAILED DESCRIPTION OF THE ILLUSTRATED EMBODIMENT

Reference is now made to the drawings wherein like numbers are used to designate like parts throughout. Referring now to FIG. 1, it will be understood that a seal, generally designated 10, comprises a body 12 of generally Y-shaped configuration. The body 12 shown is of generally annular shape, but other shapes may be selected to conform to adjacent machine parts. The body 12 comprises a base portion 16 defined by a generally planar outside side-surface 18, a radial inner planar side-surface 20, generally parallel to the outer surface 18, and a generally planar bottom surface 22. Extending upwardly from the base portion 16 is a bifurcated portion 24 comprising a pair of legs 26, 28 which define an annular generally u-shaped groove 30. The legs 26, 28 further comprise an exterior inclined radial side-surface 32 and an interior inclined radial side-surface 34, and lips 36, 37. As is apparent from FIG. 1, the side-surfaces 32, 34 diverge away from the base portion 16.

The v-shaped annular groove 30 comprises a radial inner side-surface 38 and a radial outer side-surface 40 which are generally parallel to each other and to side surfaces 18, 20. The groove 30 further comprises a first inclined bottom surface 42 adjacent the inner side-surface 38 and a second inclined bottom surface 44 adjacent the outer side-surface 40. The v-groove 30 extends relatively deeply into the body 12 of the seal 10 to provide lateral flexibility to the seal.

Referring now to FIG. 3, the ring body 12 is illustrated in enlarged cross-section. The groove 30 is divided at regular intervals into voids such as void 50, defined by annular walls 38, 40, inclined bottom surfaces 42, 44, and braces such as braces 46, 48. The annular walls 38, 40 and the braces, such as braces 46, 48, form voids having a generally trapezoidal cross section when viewed from above, as shown in FIG. 4. Mechanical pressure from adjacent machine part walls applied to the legs 26, 28 of the seal body 12 causes the trapezoidal voids, such as void 50, to collapse in a uniform manner, proportional to the applied force.

As is known in the art, the seal 10 may be made of a deformable but substantially non-compressable material, which may for instance comprise rubber, neoprene, urethane, or other suitable elastomeric or plastic material.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patents is:

1. An annular sealing ring with a generally Y-shaped cross-section for sealing between a piston and a curved wall of a cylinder comprising a base, and a pair of sealing lips for contact with said piston and said curved wall;

said base having a generally rectilinear cross-section defined by a horizontal bottom surface, a pair of spaced vertical side surfaces extending upwardly from opposite ends of said horizontal bottom surface;

said pair of sealing lips spaced apart and extending from said base, each lip having a slanted side surface projecting upwardly and outwardly from one of said vertical side surfaces, a horizontal top surface extending inwardly from the top end of said slanted side surface whereby a sealing edge is formed by the intersection of said slanted side surface and said horizontal top surface;

said pair of lips also having corresponding, similarly opposed, inner surfaces including a first pair of inner surfaces extending downwardly from said horizontal top surfaces, a second pair of slanted inner surfaces converging and extending downwardly from said first pair of inner surfaces, said inner surfaces forming the boundary of a cavity; and a plurality of braces connecting said lips, said braces joining the lips to form oblique or acute angles.

2. The annular ring assembly of claim 1 wherein all braces join the lips to form similar angles for all braces.

3. A seal with a generally Y-shaped cross-section for sealing between two adjacent machine parts comprising a base, and a pair of sealing lips for contact with said machine parts;

said base having a generally rectilinear cross-section defined by a horizontal bottom surface, a pair of spaced vertical side surfaces extending upwardly from opposite ends of said horizontal bottom surface;

said pair of sealing lips spaced apart and extending from said base, each lip having a slanted side surface projecting upwardly and outwardly from one of said vertical side surfaces, a horizontal top surface extending inwardly from the top end of said slanted side surface whereby a sealing edge is formed by the intersection of said slanted side surface and said horizontal top surface;

said pair of lips also having corresponding, similarly opposed, inner surfaces including a first pair of inner surfaces extending downwardly from said horizontal top surfaces, a second pair of slanted inner surfaces converging and extending downwardly from said first pair of slanted inner surfaces, said inner surfaces forming the boundary of a cavity; and a plurality of braces connecting said lips, said braces joining the lips to form oblique or acute angles.

4. The seal assembly of claim 3 wherein all braces join the lips to form similar angles.

* * * * *